United States Patent [19]
Stirling

[11] Patent Number: 5,016,424
[45] Date of Patent: May 21, 1991

[54] DEVICE FOR DEPLOYING TUBULAR SHEET MATERIAL, AND METHODS OF UTILIZATION THEREOF

[76] Inventor: William Stirling, P.O. Box 202, Lower Nicola, B.C., Canada, V0K 1Y0

[21] Appl. No.: 430,135

[22] Filed: Nov. 1, 1989

Related U.S. Application Data

[63] Continuation-in-part of Ser. No. 116,062, Oct. 1, 1987, abandoned.

[51] Int. Cl.$^5$ .................. B65B 9/15; B65B 25/02; B65B 39/00; B65B 31/08
[52] U.S. Cl. ...................................... 53/459; 53/444; 53/450; 53/469; 53/475; 53/148; 53/567; 53/390; 493/309; 47/66
[58] Field of Search ................ 53/443, 447, 448, 459, 53/469, 148, 236, 567, 576, 247, 450, 577, 390, 444, 475; 47/282, 29, 66; 141/114; 493/309

[56] References Cited

U.S. PATENT DOCUMENTS

| | | | |
|---|---|---|---|
| 3,687,061 | 8/1972 | Eggenmuller et al. | 141/114 X |
| 4,337,805 | 7/1982 | Johnson et al. | 141/114 X |
| 4,565,289 | 1/1986 | Lesueur | 53/444 X |
| 4,594,836 | 6/1986 | Good | 53/576 X |
| 4,606,176 | 8/1986 | Cundall | 53/576 X |
| 4,621,666 | 11/1986 | Ryan | 141/114 |
| 4,686,817 | 8/1987 | Brodrecht et al. | 53/576 X |
| 4,888,937 | 12/1989 | Glenn | 53/576 |
| 4,938,006 | 7/1990 | Korsgaard | 53/567 X |
| 4,945,715 | 8/1990 | Brodrecht | 53/576 X |

FOREIGN PATENT DOCUMENTS 2135955 9/1984 United Kingdom .................. 53/576

OTHER PUBLICATIONS

"Farm Journal Beef Extra"—Mar. 1985—pp. 10 & 11.

Primary Examiner—Horace M. Culver

[57] ABSTRACT

A compressed (e.g. accordian pleated) assembly of tubular sheet material (preferably plastic material), is deployed to form an extended tube by a device that consists essentially of an arched rigid framework (curved, triangular, rectangular, or any other shaped arch suited to the shape of the goods to be stored) with a skin of sheet metal or fiberglass extending over its upper part. The tubular sheet material can be deployed into an extended tube at the rear of the device by pulling the latter forwardly along the ground, the free end of the tube having been suitably anchored at the starting location. This tube deployment can be combined with a series of loading operations whereby goods to be stored, e.g. cylindrical or large square bales of forage, are inserted from the front of the device through the arched framework and onto a lower portion of the extended tube as it is formed. This lower portion rests on the ground in a loading area beneath a rearwardly extending overhang of the framework. When the goods to be stored are bales, they are preferably arranged in a row along the tube and in a side-by-side and/or stacked relationship, with cylindrical bales being arranged in a triangular relationship.

9 Claims, 11 Drawing Sheets

DEVICE FOR DEPLOYING TUBULAR SHEET MATERIAL, AND METHODS OF UTILIZATION THEREOF

RELATED APPLICATION

This application is a continuation-in-part of application Ser. No. 116,062 filed Oct. 1, 1987 (now abandoned).

FIELD OF THE INVENTION

This invention relates to a device for forming an extended tube usable as storage or as a shelter, by deploying a compressed assembly of tubular sheet material (normally plastic material), and to methods for utilizing such device.

The primary intended use of the device is for the bagging of bales of forage (e.g. grasses and legumes) for the production of silage or vacuum packed, high density forage.

Another use of the device is for constructing a greenhouse.

Yet another use of the device is the construction of a temporary shelter for human occupation.

PRIOR ART

It is known to bag so-called "round" bales of forage (the bales are actually cylindrical) in individual plastic bags. A round bale handler for this purpose is described in my prior Canadian patent No. 1,209,538 issued Aug. 12, 1986, and in my equivalent U.S. Pat. No. 4,648,769 issued Mar. 10, 1987.

SUMMARY OF THE INVENTION

One object of the present invention is to provide a device that will facilitate the efficient, mechanised storage of bales of any shape in an elongated plastic tube. The bales are arranged along the tube in an end-for-end relationship. At the same time they are also preferably arranged in a side-by-side and/or stacked relationship. When the bales are round, a triangular arrangement is convenient, with two bales resting on a lower part of the tube on the ground and a third bale supported above and between the two lower bales, and the upper part of the plastic tube extending over this triangular assembly. When the bales are square, they can be arranged to extend lengthwise across the tube and be stacked on top of each other, e.g. three high, in a rectangular assembly.

A further object of the invention is to provide a device that can be used for deploying an extended tube of sheet material, for use either in the storage of bales as explained above, or in the storage of other goods, or in the formation of a shelter, such as a green-house or a form of temporary housing.

BRIEF DESCRIPTION OF THE DRAWINGS

Embodiments of the invention are illustrated in the drawings, in which.

DETAILED DESCRIPTION OF THE PREFERED EMBODIMENTS

Figure 1:
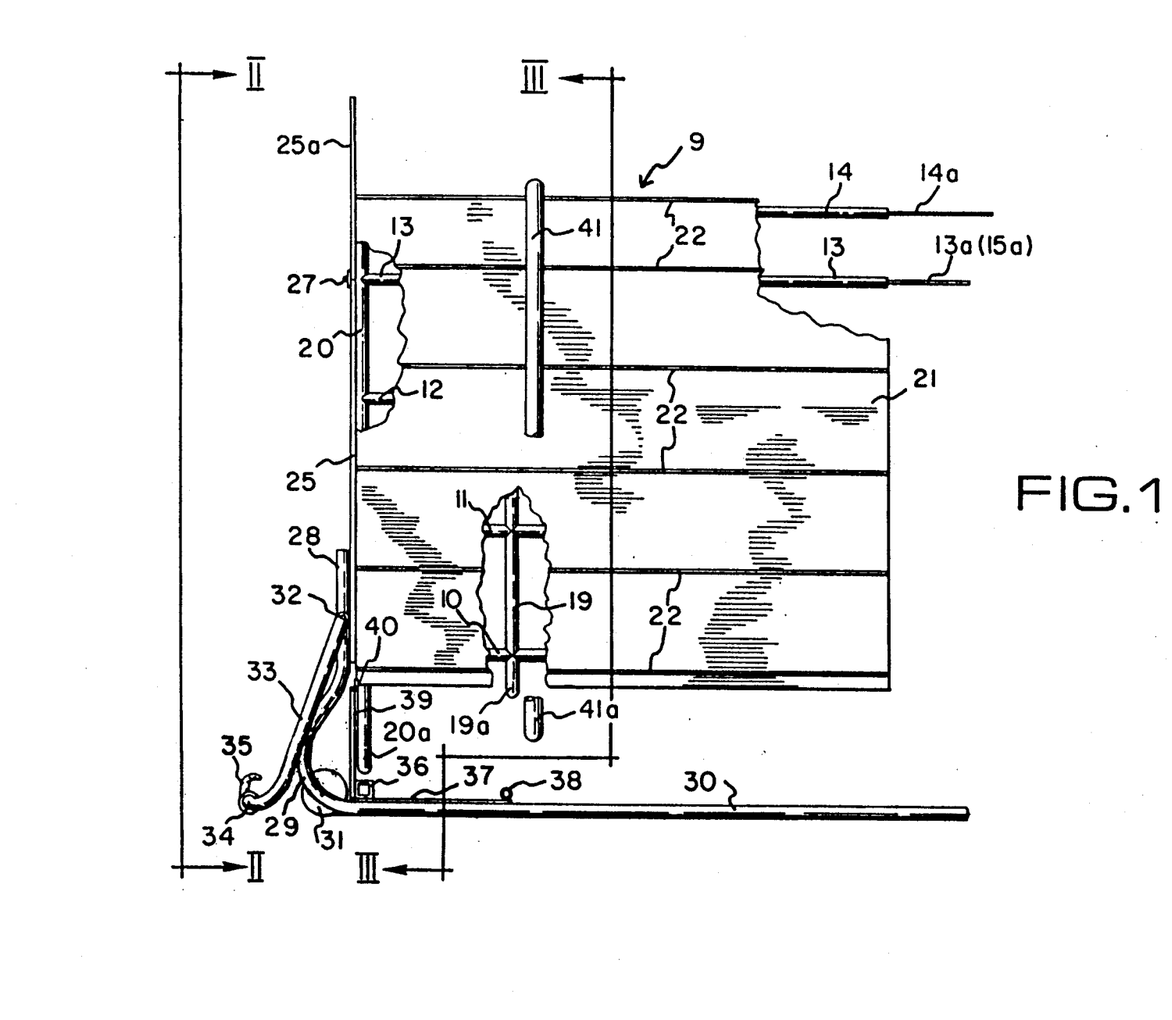
FIG. 1 is a side view of a device according to the invention with some parts cut away.
Figure 2:
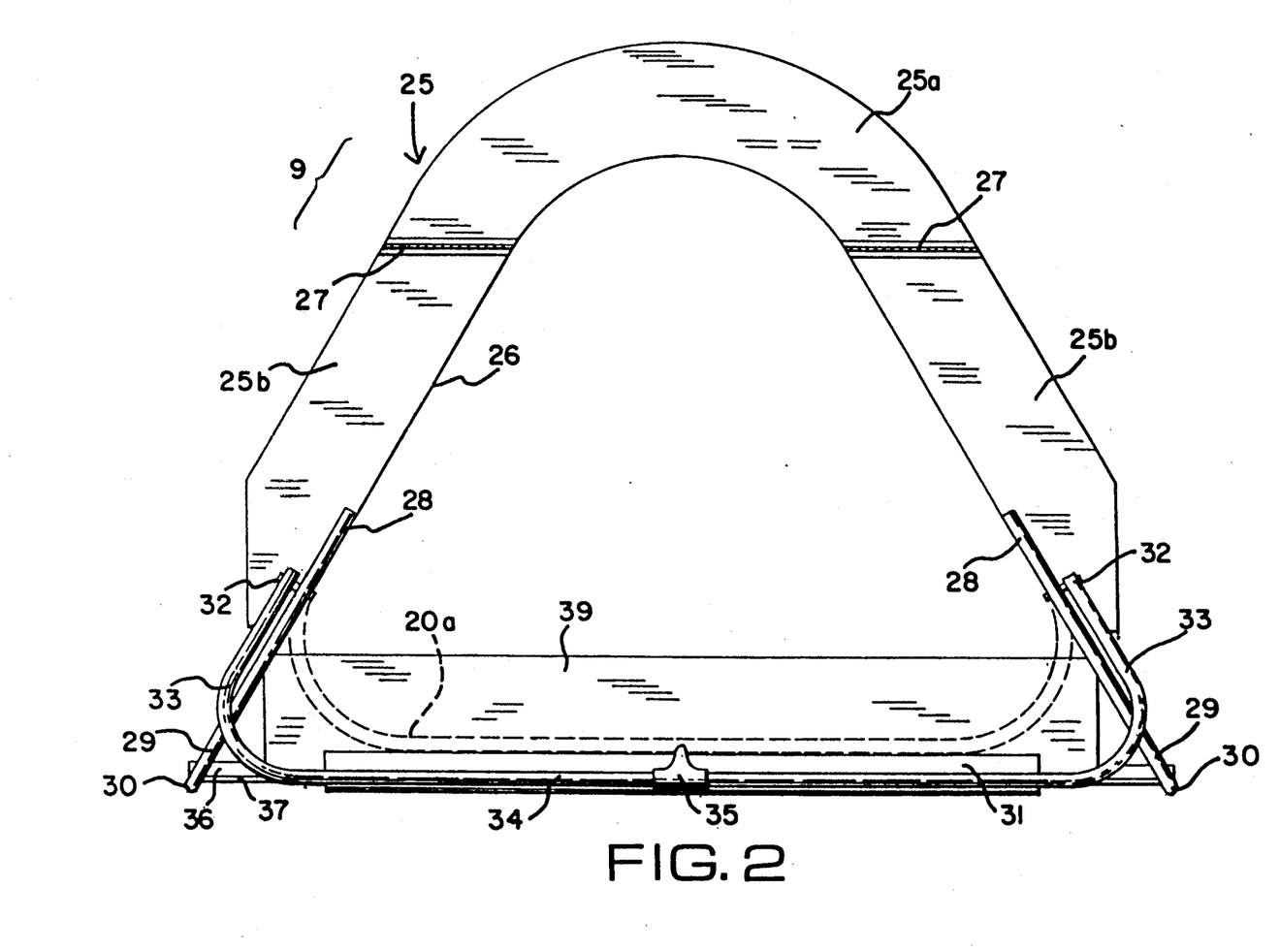
FIG. 2 is a front view, as seen on the line II—II in FIG. 1.
Figure 3:
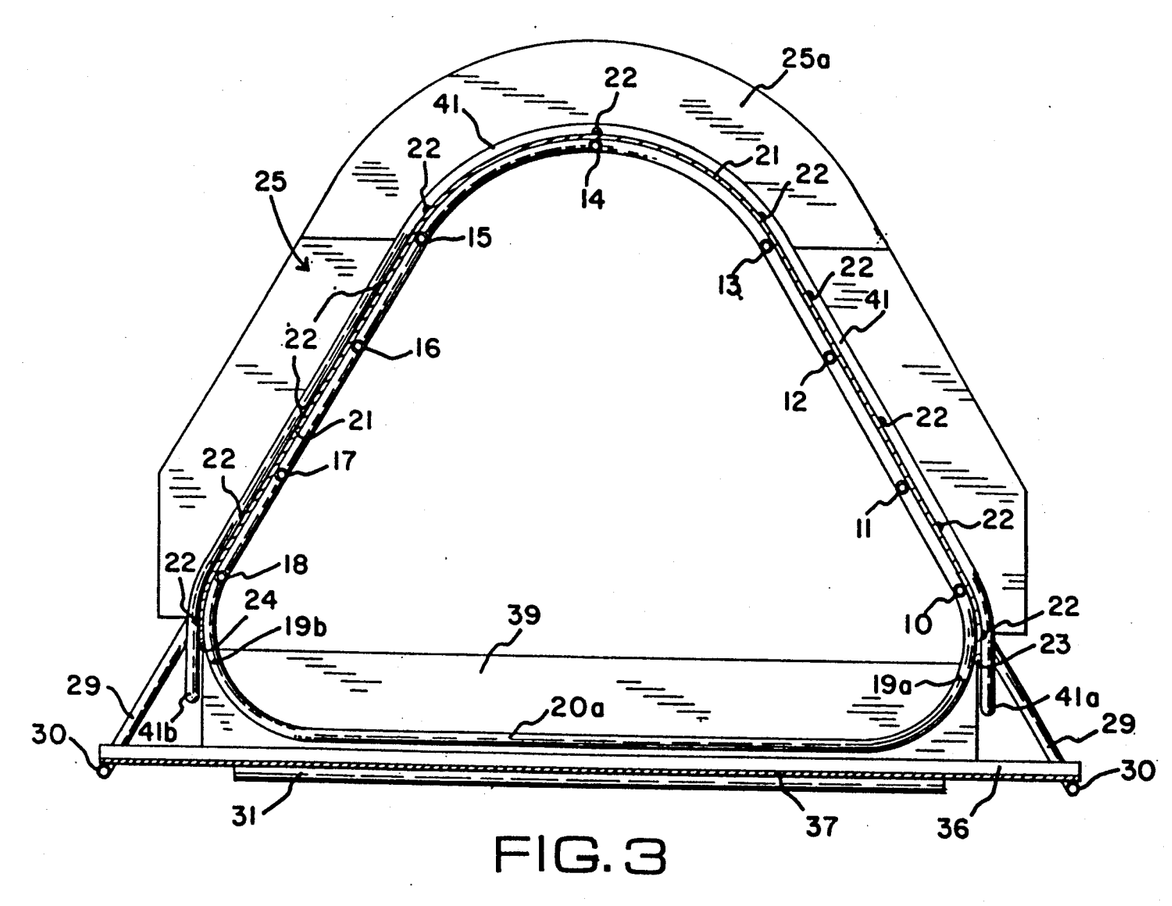
FIG. 3 is a section taken on the line III—III in FIG. 1.

As seen in FIGS. 1 to 3, a deploying device 9 consists of a framework of steel members, comprising parallel, horizontally extending, tubular members 10 to 18, arranged in the shape of an arch and interconnected by transverse tubular members 19 and 20 that are spaced apart in the front-to-rear direction. The rearward member 19 extends up one side of the framework from a bottom end 19a, over the convex top thereof, and down the other side to the other bottom end 19b. The forward member 20 is similar, except that its bottom ends are joined together by a transverse portion 20a. Covering and supported by this framework there is an upwardly curving skin 21 of sheet steel that is provided with a series of horizontal ridges 22 spaced around its full extent from one lower edge 23 to the other lower edge 24.

Secured to the member 20 at the front end of the device there is a steel guard plate 25, an inner edge 26 of which defines the same arch-shape as the framework. An upper part 25a of the guard plate 25 is hinged to lower parts 25b by hinges 27 to enable the upper part to swing forward and down. This arrangement lowers the total height of the device for transportation. In use, the upper part 25a will be secured in its erect position as shown in the drawings. Secured to a lower forward face of the guard plate 25 on each side of the device, there is a vertical tubular member 28 that is curved forward at 29 and then rearwardly to form a skid 30 by means of which the device is supported on the ground.

Alternatively, the member 30 can serve to mount wheels (not shown) that support the device on the ground. The portions 29 on each side of the device together support an elongate rubber roller 31 that extends horizontally across the front of the device and contacts the ground while being freely pivotable about its axis. Pivoted by a pin 32 to each member 28 there is an upstanding arm 33 of a horizontal draw bar 34, in the transverse centre of which there is a hook 35.

The front ends of the skids 30 are interconnected across the device by a square-section, tubular member 36 and by a flat, horizontal, stabilizing platform 37. At the rear edge of such platform there is a further, transverse, tubular member 38. The member 36 acts as a stop for the bottom edge of a vertical, protector plate 39 which hangs down from a hinge 40, whereby, when desired, this plate can be swung forwards and upwards to lie vertically against the front of the device.

On the outside surface of the skin 21, about one third of the distance to the rear of the device from the front guard plate 25, there is welded a further tubular member 41 that forms a bulge that extends over the full extent of the arch from its respective bottom ends 41a, 41b.

At their rear ends the upper members 13, 14 and 15 have rearwardly projecting, extension rods 13a, 14a and 15a.

Figure 4:
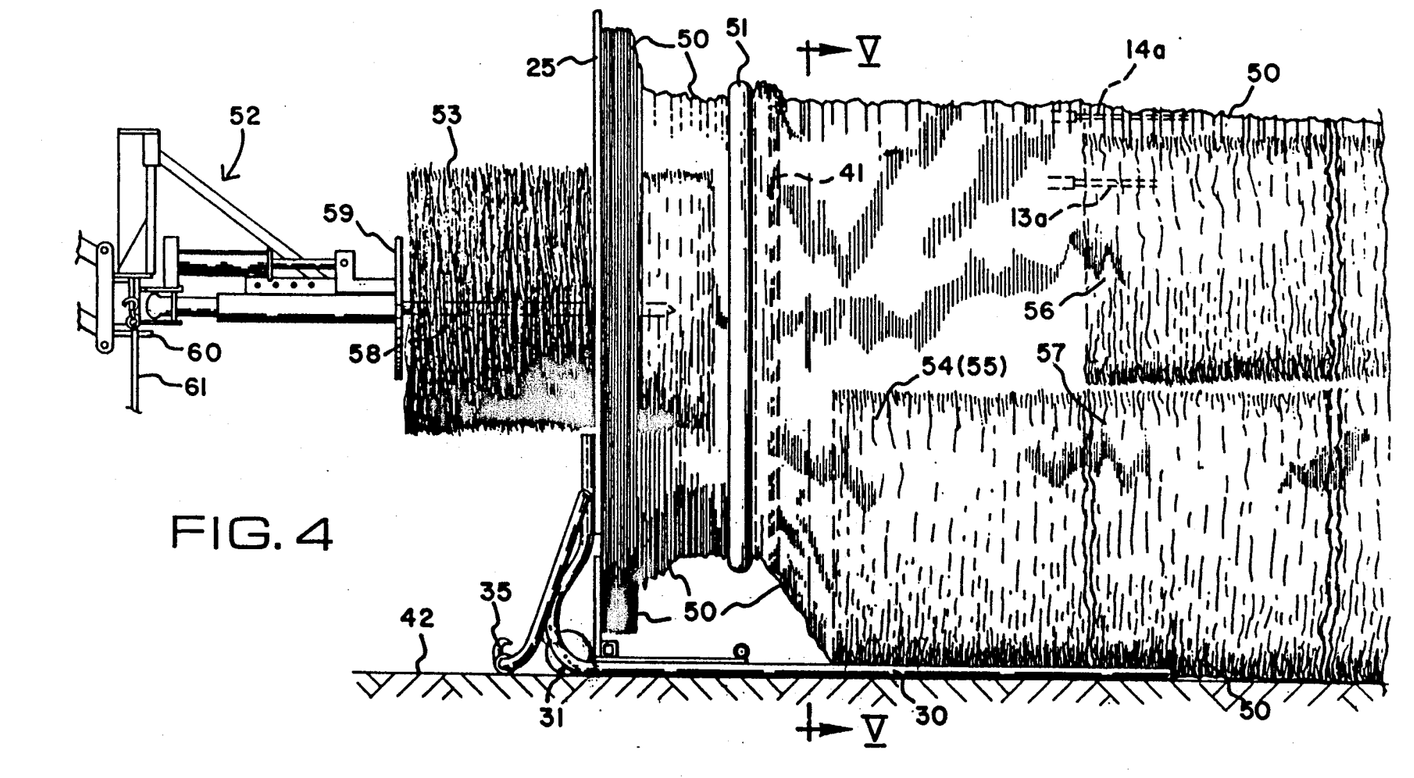
FIG. 4 is a diagrammatic side view illustrating how the device can be used.
Figure 4A:
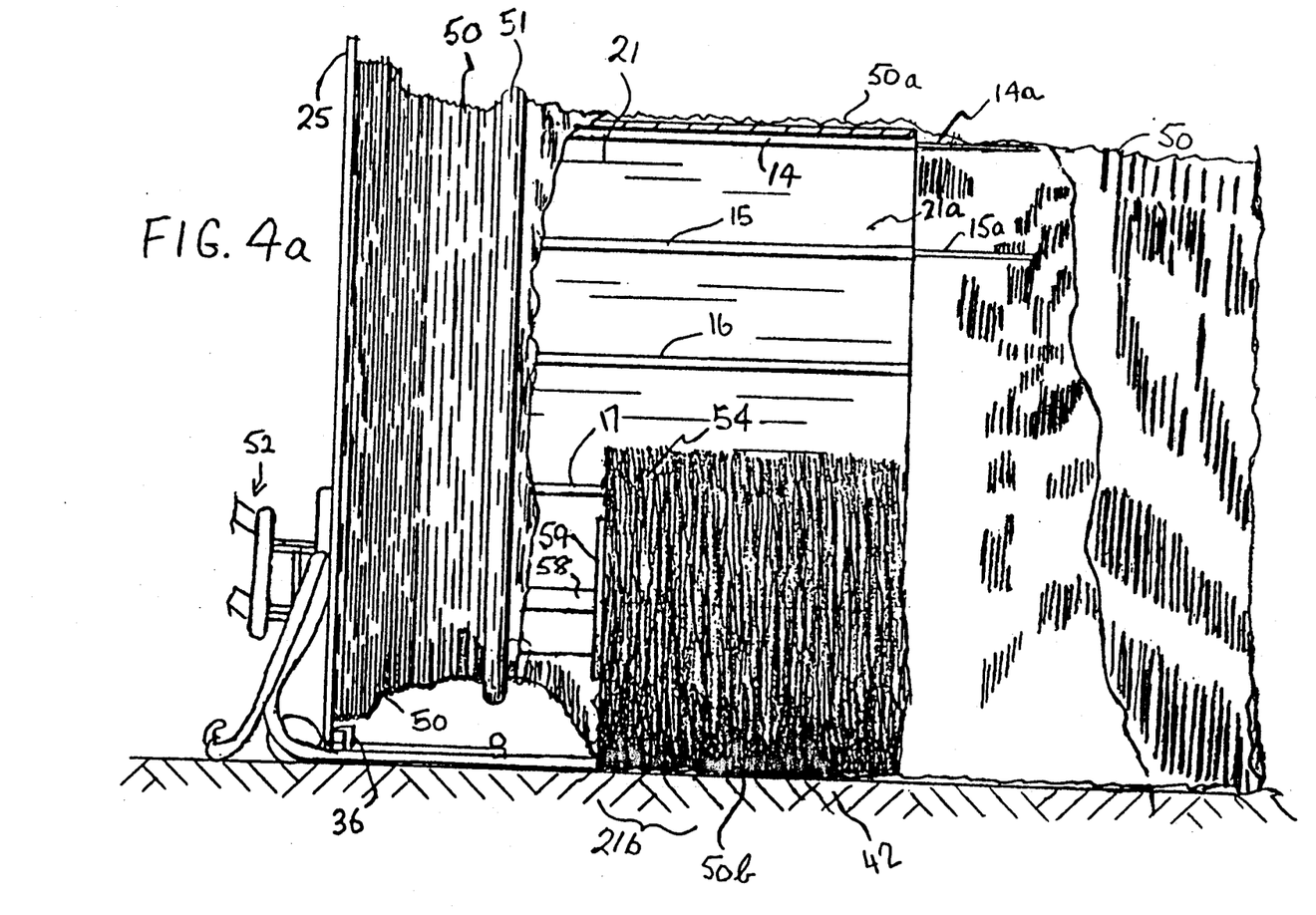
FIG. 4a is a cut away view similar to FIG. 4 at an earlier stage of a loading operation.
Figure 5:
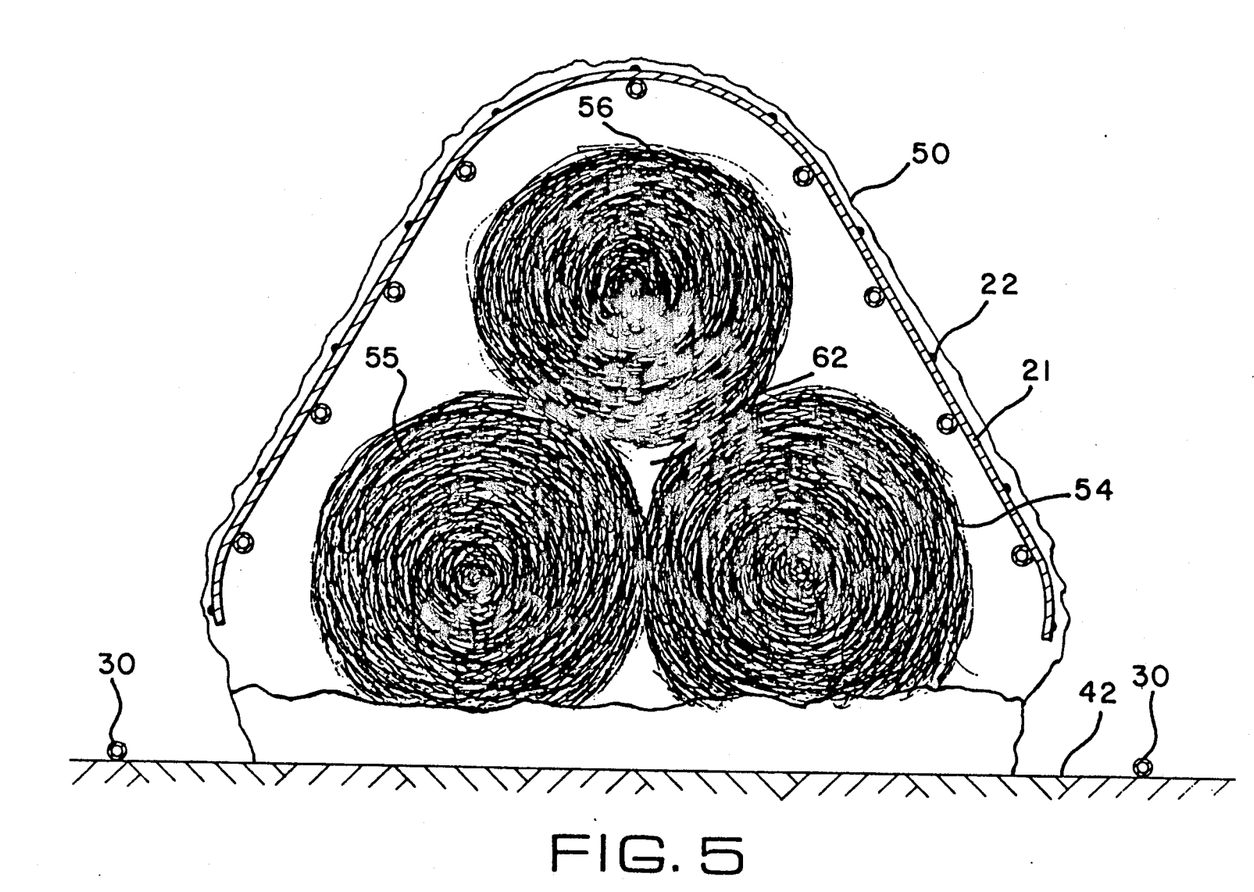
FIG. 5 is a section on the line V—V in FIG. 4 at a later stage of such operation.

FIGS. 4, 4a and 5 illustrate diagrammatically the preferred manner of using the device for bagging round bales. A compressed assembly of tubular, plastic, sheet material 50, arranged in accordian pleats, is mounted to extend around the arch defined by the skin 21 immediately behind the guard plate 25. An end (not shown) of this material 50 will have been pulled by hand to the right in FIGS. 4 and 4a to move off the device. Such end will have been closed and anchored at a desired location by suitable means. The arch formed by the rearward portion of the skin 21 is downwardly open and hence forms a rearwardly extending overhang 21a. This rear overhang 21a of the skin 21 supports upper portions 50a of the tubular material 50, as seen in FIG. 4a, above an area within such tube that constitutes a loading area 21b in which area lower portions 50b of the tubular material 50 rest on the ground 42. As the device 9 is moved forward on its skids 30 and roller 31 along the ground 42, the tubular sheet material 50 is drawn rearwardly away from the accordian pleat assembly over the skin 21. The ridges 22 serve to facilitate this relative movement and to avoid the sheet material 50 adhering to the skin 21.

Immediately in front of the location where the tubular sheet material 50 passes over the bulge caused by the member 41, there will be placed a tube 51 to lie over the sheet material 50. This tube 51 is preferably made of PVC piping and extends around almost the entire circumference of the tubular sheet material 50. The two ends of this tube 51, which are preferably located beneath the device 9, are then inter-connected by an elastic member (not shown). The tube 51 thus becomes a closed hoop extending comparatively tightly around the tube of sheet material 50 on the skin 21 of the device, but nevertheless having some ability to expand and contract its diameter by means of flexure of the elastic member that joins its two ends. The tube 51 and the member 41 thus cooperate to form means for restricting (but not preventing) relative movement between the device 9 and the extended tube of sheet material 50 formed behind the device. Combined with the anchoring of the initial end of the material, the result is to apply a forwardly directed tension to the extended tube as the device travels forward.

The bales of forage are introduced into the extended tube 50 by means of a round bale handler of the type described in the above-mentioned patent. Only the forward tool portion 52 of this handler is shown in outline in FIG. 4. This tool portion 52 will be mounted on a tractor (not shown), whereby it can be moved forwards and backwards, sideways, and up and down, as required. A round bale 53 is speared by, and supported on, a spike 58 that projects from the tool portion 52. FIG. 4a shows how this spike 58 can place a bale 54 on top of the lower portion 50b of the plastic material in the loading area 21b situated beneath the overhang 21a.

Shown at 54–57 in FIGS. 4 and 5 are similar bales that have been loaded into the extended tube 50 in an end-for-end and side-by-side and stacked triangular arrangement. FIG. 4 shows the bale 53 in the process being placed between, and on top of, the bales 54, 55. FIG. 5 shows a previously loaded third bale in position as bale 56. When the bale 53 is thus in position, the spike 58 is withdrawn from it, if necessary employing a hydraulically operated push-off plate 59 to prevent the bale from being withdrawn with the spike. The long reach of the round bale handler is especially useful in enabling the bales to be effectively introduced into the tube through the arch formed by the deploying device and deposited on the lower portion 50b lying on the ground 42 in the loading area 21b beneath the overhang or on an already loaded bale.

If the goods to be stored are other than bales, a loading machine best suited to the handling of such goods can be used to load them into the extended tube as it is formed.

A transverse I-beam 60 of the tool portion 52 has a hole at each end, into which holes there are hooked the two ends of a loop of cable 61, the centre of which is used to engage the draw-bar hook 35 for pulling the device 9 forward along the ground. The cable 61 will tend automatically to centre itself in the hook 35. However, in addition, during such forward pulling operation the spike 58 can be inserted in the space 62 (FIG. 5) between the stacked bales. This ensures centering and straight pulling of the device 9. Other means for connecting the tractor to the device 9 and hence enabling the operation to be carried out by a single operator can be employed.

The forward movement of the device will preferably be incremental, rather than continuous, with the bales being inserted while the device is stationary between movements.

During the forward movement, the roller will serve the function of smoothing the path in front of the device, e.g. pushing any sharp rocks into the ground and flattening any straw stubble or other projecting growth, in order to minimise damage to the plastic material that comes to lie on the ground behind such roller.

The invention is not limited to use with bales. Any other goods can be stored in the extended tube as it is being formed, and can serve the function of retaining the tube erect.

Figure 6:
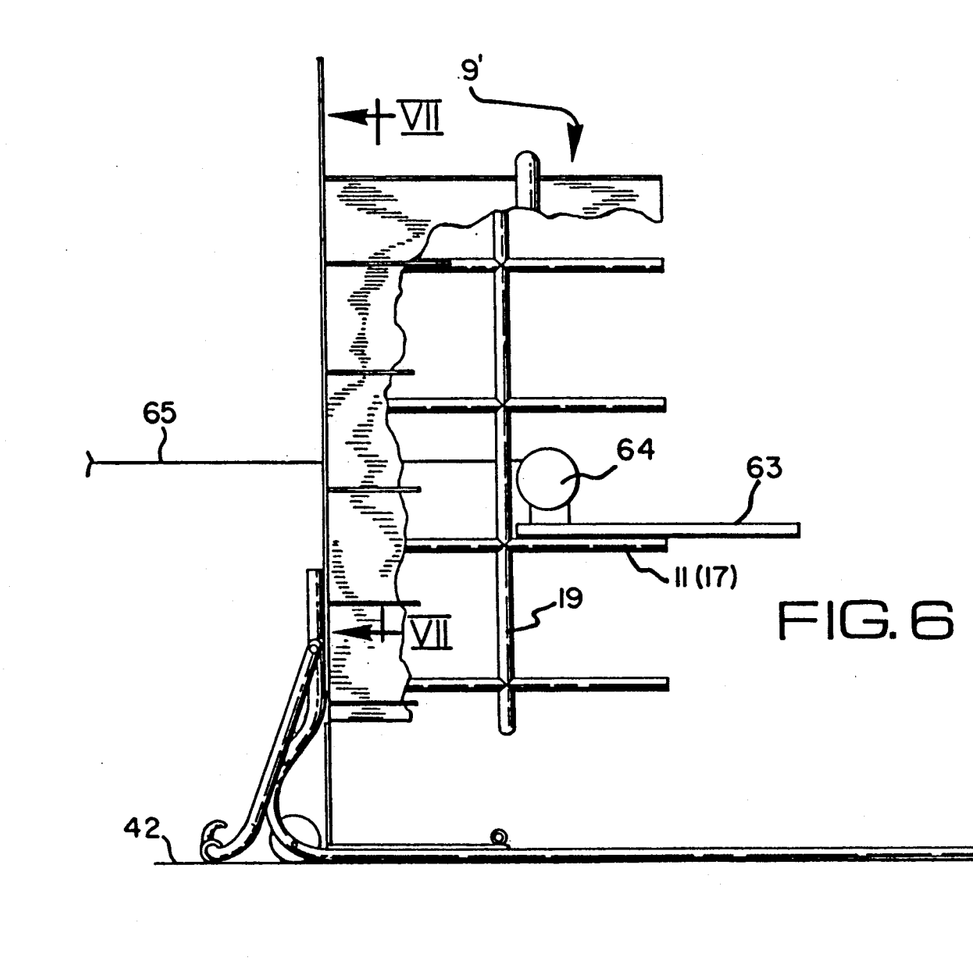
FIG. 6 is a cut-away side view of a modification.
Figure 7:
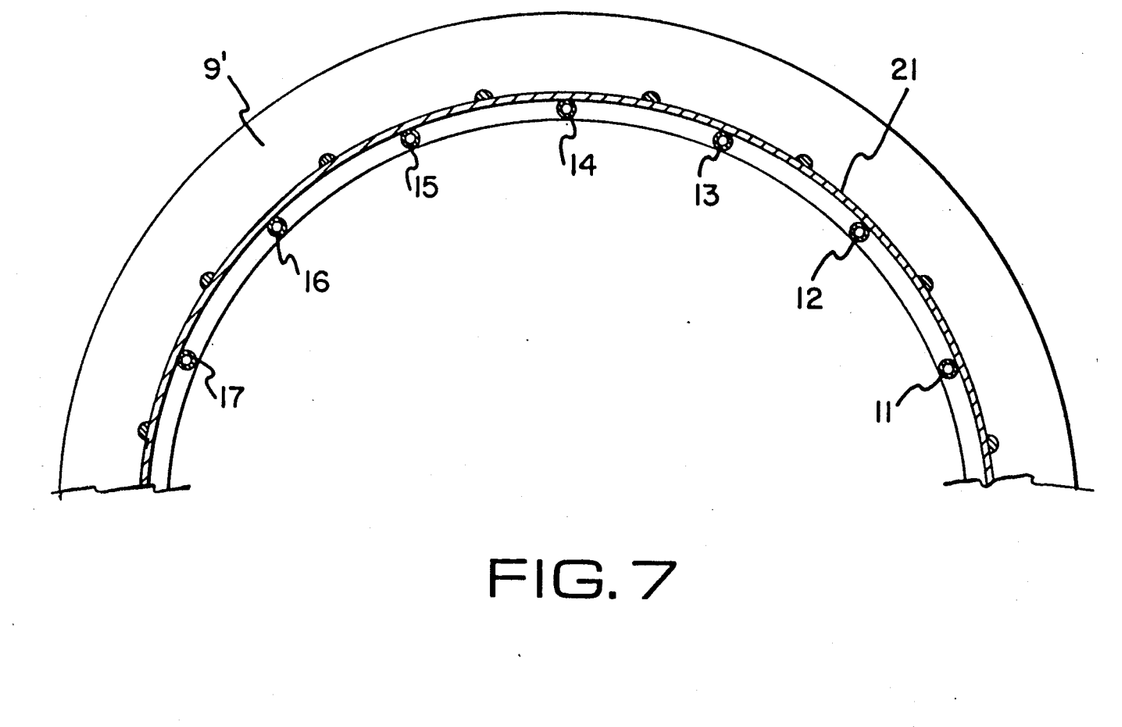
FIG. 7 is a partial sectional taken on the line VII—VII in FIG. 6.

Another use for a modified version 9' (FIGS. 6 and 7) of the device 9 is for the construction of a shelter for temporary human accommodation, or for the storage of goods, or as a greenhouse. In the former cases the plastic material of the tube 50 will preferably be opaque (e.g. a plastic sheet reinforced with nylon fibers, white on the outside, and black on the inside). On the other hand, for greenhouse use, the material of the tube 50 will be translucent. As shown in FIG. 6, the device 9' is shorter in the front-to-rear direction than the device 9, but otherwise it is essentially the same in structure, although the arch is semicircular (FIG. 7). If preferred, the arch can be semielliptical or of any other convenient shape. The framework members 11 and 17 support a platform 63 on which a man can stand to erect a fixed support framework (not shown) that will be required to keep the tube 50 erect as it is deployed behind the device when the latter moves forward. Such a support framework could, for example, consist of a system of aluminum or fiberglas tubes designed for easy locking into place at regular intervals along the extended tube as it is formed.

When such a shelter is used as a greenhouse, if desired the portion of the tube 50 that forms the floor can be cut down the middle and rolled to the sides to provide access to the ground. Alternatively, the crops can be planted through the plastic. As a still further alternative, the plastic can be left intact and a hydroponic system used.

The device 9' can be moved forward by any suitable means, one of which, as shown in FIG. 6, is a winch 64 mounted on the platform 63 and having a cable 65 extending forwardly to a fixed object (not shown), in which case there will no longer be any need for the draw bar 34.

Moreover, when a greenhouse is being formed, the roller 31 can often be dispensed with, especially if the ground has already been cultivated in advance.

Returning to a discussion of the primary use of a device according to the invention, namely for bagging bales, and especially round bales, the triangular stacking arrangement described above is advantageous in providing good air circulation around the stored round bales, a feature that is especially useful when the bales are of straw and require to be treated with an injection of anhydrous ammonia in the known manner. By injecting the gaseous ammonia at one location in the loaded and sealed tube, a large number of bales can be treated simultaneously by virtue of the space 62, much more economically from the viewpoint of labour than has hitherto been possible.

Alternatively, the air can be evacuated from the loaded and sealed tube by a suitable vacuum device, e.g. as is often desirable for the storage of vegetables etc.

Finally, the product, i.e. a sealed tube loaded with bales that in due time become edible animal silage, can constitute a feeding station to which the animals are brought, without any need to transport the silage to the herd. The farmer need simply slit the plastic material from one end of the tube to the other to expose the silage, and then mount an electric fence along the silage, through which fence the animals can feed in an orderly manner.

Figure 8:
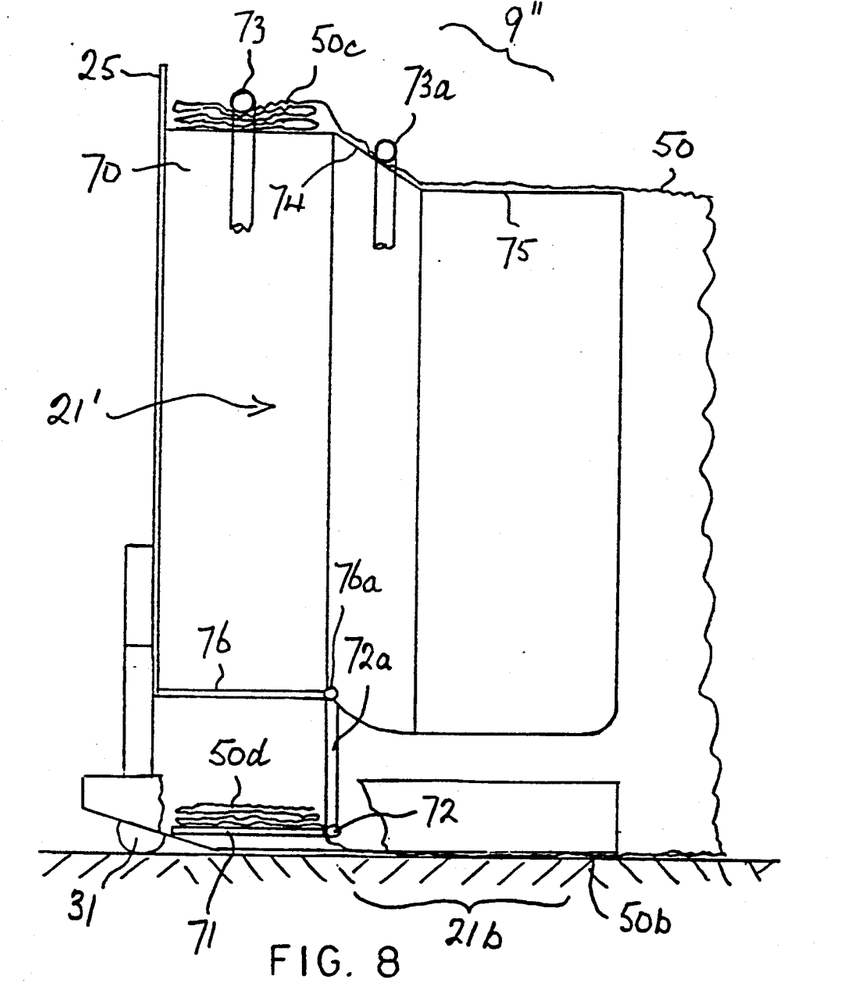
FIG. 8 is a diagramatic and partly cut away side view of an alternative embodiment.
Figure 9:
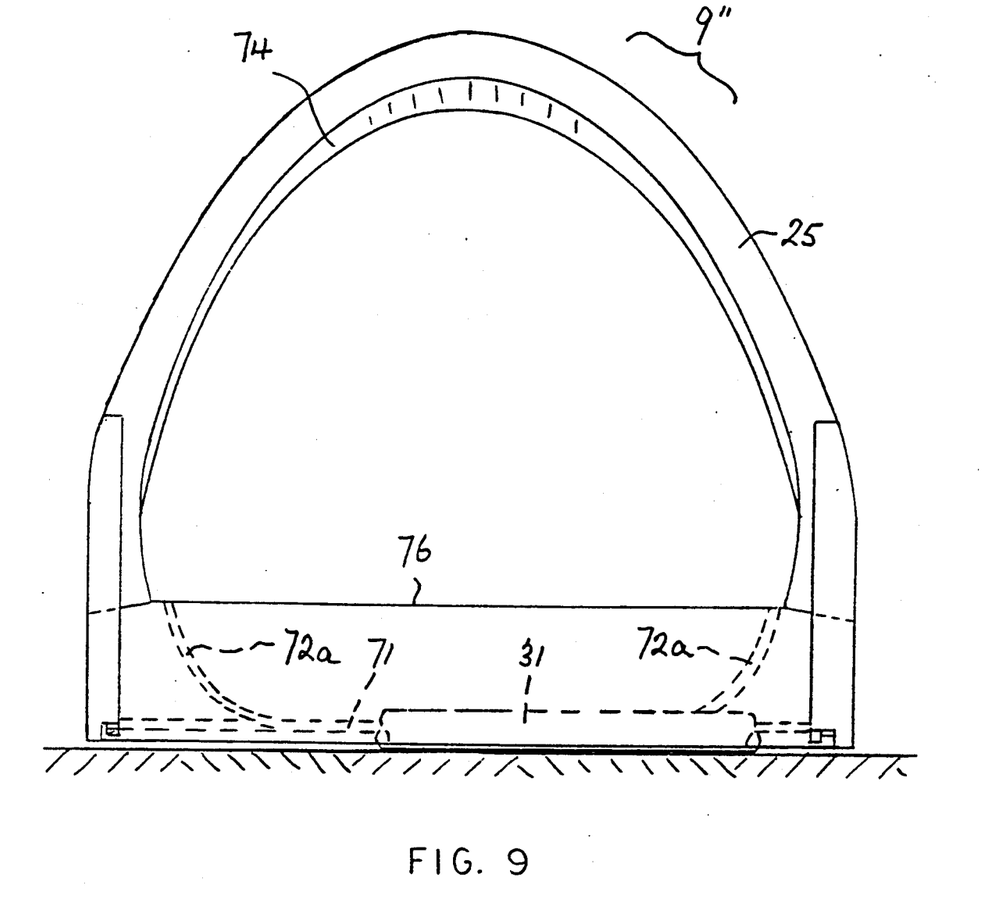
FIG. 9 is a front view of FIG. 8.

In the alternative embodiment shown in FIGS. 8 and 9, the plastic tubular material 50 is stacked in horizontal pleats 50c around a forward portion 70 of a fiberglass skin 21' of a further modified device 9", the lower portions 50d of this material being supported on a tray 71 that extends laterally across the device, being supported at its ends by the framework just rearwardly of the roller 31. Rearward feeding of the lower portions 50d when the device moves forward is inhibited enough to maintain sufficient tension in the material 50 by a guide bar 72, end arms 72a of which extend down from a frame member. The arms 72a are connected to the frame by spring mountings (not shown) so as to exert a slight pressure on the material 50 passing between the bar 72 and the tray 71. Also, the mountings enable the bar 72 to be swung up and rearwardly to a disengaged position for loading the pleated tubular material onto the tray 71. At the top and down the sides of the forward portion 70 of the device, the pleated portion 50c is compressed by means of a retainer 73 in the form of a plastic tube which has an inverted U shape. The lower ends of the tube 73 are tethered to the framework by straps (not shown).

Rearwardly of the forward portion 70 there is a sloping, "drop-down" portion 74, and still further to the rear a horizontal portion 75. As seen in FIG. 9, the device 9" retains the arch shape of the earlier embodiments, while still providing a loading area 21b beneath an overhang formed by the portions 74 and 75. The material 50b lies on the ground in this loading area in the same manner as in FIG. 4a, and this loading area is located rearwardly of a loading platform 76 that extends across the device beneath the arch formed by the skin portion 70.

A retainer 73a similar to the retainer 73 can restrict movement of the material 50 along the sloping portion 74.

Loading is carried out in essentially the same manner as already described, the sloping portion 74 aiding guiding the bales into place and permitting a downward movement of the upper part 50c of the material 50 to accommodate the downward movement of the lower part 50d of the material 50 onto the ground off the tray 71. A slightly projecting bead 76a is provided along the rear edge of the loading platform 76 for engagement by a bale being moved across the platform 76 and into the loading area 21b and provides an edge for abutment by the bale when the spike 58 of the loading machine is withdrawn.

Figure 10:
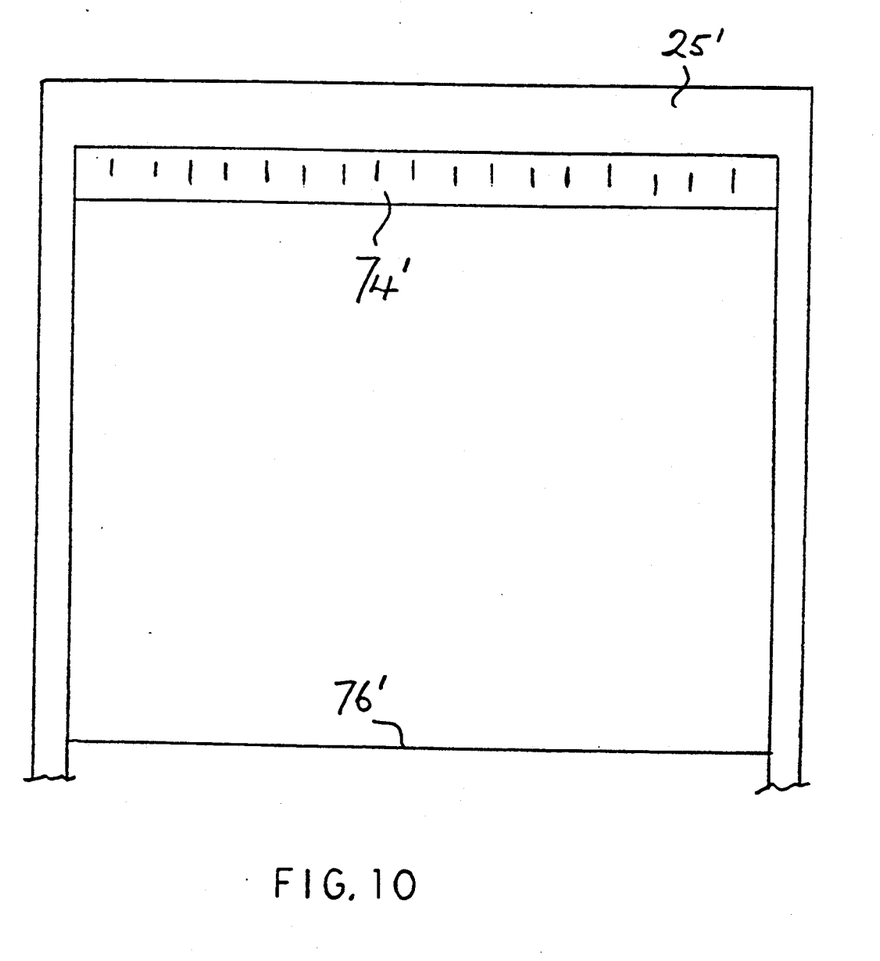
FIG. 10 is a front view of a still further modification.

The invention is not limited to a curved arch. For example, as shown in FIG. 10, a rectangular arch can be used. This figure shows a fron view of a rectangular front guard plate 25' from the rear of which there will extend a rectangular, arched skin, only a drop-down portion 74' of which is seen in FIG. 10. A side view of this construction will appear essentially the same as FIG. 8. The lower parts below a loading platform 76' have been omitted from FIG. 10, since they will be basically the same as in FIG. 9, including a tray corresponding to the tray 71. This rectangular construction would be suitable for loading a row of rectangular bales to extend lengthwise across the device and be stacked on top of each other.

The exact shape of the arch is not critical to the present invention and could be any shape, including triangular, that is best suited to the loading of the bales or other goods to be stored.

I claim:

1. A method of bagging a plurality of cylindrical bales of forage comprising moving a compressed assembly of tubular sheet material away from an anchored end of such material whereby to deploy said material as an extended tube, and inserting into such extended tube a plurality of cylindrical bales of forage in an end-for-end series, wherein said bales are also arranged in a triangular array with two bales side-by-side on a lower portion of the tube and a third bale resting on and between said two bales, the three bales defining a central space between them, said space extending along the end-for-end series of bales.

2. A method according to claim 1, including restricting relative movement between the device and the sheet material in order to tension the extended tube.

3. A method of bagging a plurality of cylindrical bales of forage using a device comprising a rigid framework and ground-engaging means connected to the framework to mount the same for travel along the ground, said framework being arch-shaped transversely of its direction of travel and having a forward portion loaded with a compressed assembly of tubular sheet material and a further portion located rearwardly of said forward portion for deploying said material in the form of an extended tube upon forward travel of the device, the method comprising
(a) drawing an end of said tubular sheet material rearwardly off the device and closing and anchoring said end, and
(b) moving the device forward away from the anchored end to deploy the material as an extended tube while inserting said bales from the front of the device through the framework and into the extended tube in and end-for-end series, (c) wherein the bales are placed in the tube in a triangular array with two lower bales side-by-side on a lower portion of the tube and an upper bale resting on and between the two lower bales, the three bales defining a central space between them, said space extending along the end-for-end series of bales.

4. A method of bagging a plurality of bales of forage using a device comprising a rigid framework and groundengaging means connected to the framework to mount the same for travel along the ground, said framework being arch-shaped transversely of its direction of travel and having a forward portion loaded with a compressed assembly of tubular sheet material and a further portion extending rearwardly of said forward portion, said further portion having the shape of a downwardly open arch that forms a rearwardly extending overhang for deploying said material in the form of an extended tube upon forward travel of the device with said overhang supporting upper portions of such tube above a loading area in which a lower portion of the tube rests on the ground, said method comprising (a) drawing an end of said tubular sheet material rearwardly off the device and closing and anchoring said end, and (b) moving the device forward away from the anchored end to deploy the material as an extended tube while inserting said bales from the front of the device through the framework and into the extended tube in said loading area, said overhang extending sufficiently rearwardly to retain said upper portions of the tube out of contact with bales located in the loading area.

5. A method according to claim 4, wherein said bales are arranged in such loading area in a triangular array with two bales side-by-side on the lower portion of the tube and a third bale resting on and between said two bales.

6. A device for bagging a plurality of bales of forage, comprising:

(a) a rigid framework, and (b) ground-engaging means connected to said framework to mount the same for travel along the ground, (c) said framework being arch-shaped transversely of its direction of travel and having a forward portion for receiving a compressed assembly of tubular sheet material and a further portion located rearwardly of said forward portion for deploying said material in the form of an extended tube upon forward travel of the device, said framework defining a loading area in which a lower portion of the tube rests on the ground, said loading area being for receiving a plurality of bales in a side-by-side, stacked triangular array, (d) said further portion having the shape of a downwardly open arch forming a rearwardly extending overhang, said overhang supporting upper portions of the extended tube above the loading area and extending rearwardly at least as far as a most rearward edge of a said bale in the loading area whereby to retain said upper portions of the tube out of contact with each of said plurality of bales as they are inserted into the loading area.

7. A device according to claim 6, including means for resisting said deployment of the material to maintain tension in the extended tube as it is formed.

8. A method of bagging a plurality of bales of forage using a device comprising, a rigid framework, and ground-engaging means connected to said framework to mount the same for travel along the ground, said framework being arch-shaped transversely of its direction of travel and having a forward portion for receiving a compressed assembly of tubular sheet material and a further portion located rearwardly of said forward portion and having the shape of a downwardly open arch forming a rearwardly extending overhang for deploying said material in the form of an extended tube upon forward travel of the device, said overhang supporting upper portions of such tube above a loading area within the tube, at which loading area the lower portion of the tube rests on the ground, said method comprising (a) loading the device with said compressed assembly of tubular sheet material, (b) drawing an end of said sheet material rearwardly off the device and closing and anchoring said end, and (c) moving the device forward away from the anchored end to deploy the material as an extended tube while inserting said bales from the front of the device through the framework and into the extended tube in said loading area, said bales being arranged in such loading area in a triangular array with two bales side-by-side on the lower portion of the tube and a third bale resting on and between said two bales with said upper portions of the tube held out of contact with said third bale by said overhang.

9. A method according to claim 8, including restricting relative movement between the device and the sheet material in order to tension the extended tube.

* * * * *